US012587607B2

(12) United States Patent
Song et al.

(10) Patent No.: US 12,587,607 B2
(45) Date of Patent: Mar. 24, 2026

(54) CORRECTION OF COLOR TINTED PIXELS CAPTURED IN LOW-LIGHT CONDITIONS

(71) Applicant: QUALCOMM Incorporated, San Diego, CA (US)

(72) Inventors: Boen Song, Shenzhen (CN); Ke He, Shenzhen (CN); Xiande Liu, Shenzhen (CN); Xinfeng Zhang, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 17/999,149

(22) PCT Filed: Jul. 13, 2020

(86) PCT No.: PCT/CN2020/101650
§ 371 (c)(1),
(2) Date: Nov. 17, 2022

(87) PCT Pub. No.: WO2022/011504
PCT Pub. Date: Jan. 20, 2022

(65) Prior Publication Data
US 2023/0199133 A1 Jun. 22, 2023

(51) Int. Cl.
*G06V 10/56* (2022.01)
*G06T 5/73* (2024.01)
(Continued)

(52) U.S. Cl.
CPC .............. *H04N 1/6005* (2013.01); *G06T 5/73* (2024.01); *G06T 5/92* (2024.01); *G06V 10/56* (2022.01);
(Continued)

(58) Field of Classification Search
CPC .......... H04N 1/6005; H04N 9/69; H04N 9/77; H04N 23/86; H04N 1/6027; H04N 9/643;
(Continued)

(56) References Cited

U.S. PATENT DOCUMENTS

| 8,358,319 | B2 | 1/2013 | Cote et al. |
| 9,741,099 | B2 | 8/2017 | Lim et al. |
| (Continued) | | | |

FOREIGN PATENT DOCUMENTS

| CN | 1539129 A | 10/2004 |
| CN | 106878634 A | 6/2017 |
| (Continued) | | |

OTHER PUBLICATIONS

Taiwan Search Report—TW110122750—TIPO—Jun. 26, 2024.
(Continued)

*Primary Examiner* — Matthew C Bella
*Assistant Examiner* — Andrew B. Jones
(74) *Attorney, Agent, or Firm* — QUALCOMM Incorporated

(57) ABSTRACT

Aspects of the present disclosure relate to color correction in image processing pipelines. An example method may include receiving first image data corresponding to reference luminance data and reference chrominance data for each of a plurality of pixels, determining that the first image data corresponds to a raw image captured in a dark environment, generating second image data by performing one or more tone mapping operations on the first image data, the second image data corresponding to current luminance data and current chrominance data for each of the plurality of pixels, and generating output image data. For each pixel of the plurality of pixels, the output data may include an output luminance value of a corresponding pixel of the current luminance data, and chrominance values of the corresponding pixel from a selected one of the reference chrominance data and the current chrominance data, the selection based at least in part on the reference chrominance data and the current chrominance data.

27 Claims, 4 Drawing Sheets

(51) Int. Cl.

| | |
|---|---|
| *G06T 5/92* | (2024.01) |
| *G06V 10/75* | (2022.01) |
| *H04N 1/60* | (2006.01) |
| *H04N 9/69* | (2023.01) |

(52) U.S. Cl.
CPC ............. *G06V 10/751* (2022.01); *H04N 9/69* (2013.01); *G06T 2207/10024* (2013.01)

(58) Field of Classification Search
CPC ... G06T 5/73; G06T 5/92; G06T 2207/10024; G06V 10/56; G06V 10/751
See application file for complete search history.

(56) References Cited

U.S. PATENT DOCUMENTS

| | | | |
|---|---|---|---|
| 10,440,299 B2 | 10/2019 | Lin et al. | |
| 10,559,073 B2 | 2/2020 | Nishimura | |
| 10,694,129 B2 | 6/2020 | Cote et al. | |
| 2002/0171852 A1 | 11/2002 | Zhang et al. | |
| 2003/0020932 A1 | 1/2003 | Youngers | |
| 2004/0085475 A1* | 5/2004 | Skow ................... | H04N 23/843 |
| | | | 348/E5.037 |
| 2010/0195906 A1* | 8/2010 | Uliyar ................... | H04N 23/81 |
| | | | 382/167 |

| | | | |
|---|---|---|---|
| 2015/0078661 A1 | 3/2015 | Granados et al. | |
| 2017/0034519 A1 | 2/2017 | Rosewarne | |
| 2018/0096467 A1 | 4/2018 | Chesnokov | |
| 2019/0260978 A1 | 8/2019 | Guérin et al. | |
| 2021/0250564 A1* | 8/2021 | Pieri ........................ | H04N 9/79 |

FOREIGN PATENT DOCUMENTS

| | | |
|---|---|---|
| CN | 111295688 A | 6/2020 |
| JP | 2003044846 A | 2/2003 |
| TW | I465104 B | 12/2014 |
| WO | 2011156074 A3 | 4/2012 |
| WO | 2019245876 A1 | 12/2019 |

OTHER PUBLICATIONS

Supplementary European Search Report—EP20945328—Search Authority—The Hague—Mar. 18, 2024.
International Preliminary Report on Patentability—PCT/CN2020/101650, The International Bureau of WIPO—Geneva, Switzerland, Jan. 26, 2023.
International Search Report and Written Opinion—PCT/CN2020/101650—ISA/EPO—Apr. 9, 2021.

* cited by examiner

300

400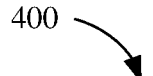

Receive first image data corresponding to reference luminance data and reference chrominance data for each of a plurality of pixels. 402

Determine that the first image data corresponds to a raw image captured in a dark environment. 404

Generate second image data by performing one or more tone mapping operations on the first image data, the second image data corresponding to current luminance data and current chrominance data for each of the plurality of pixels. 406

Generate output image data for each pixel of the plurality of pixels. 408

For each pixel of the plurality of pixels, generate the output image data to include an output luminance values of a corresponding pixel of the current luminance data. 408A For each pixel of the plurality of pixels, generate the output image data to include chrominance values of the corresponding pixel from a selected one of the reference chrominance data and the current chrominance data, the selection based at least in part on the reference chrominance data and the current chrominance data. 408B

Figure 4

CORRECTION OF COLOR TINTED PIXELS CAPTURED IN LOW-LIGHT CONDITIONS

This application is a national stage application under 35 U.S.C. § 371 of PCT Application No. PCT/CN2020/101650, filed Jul. 13, 2020. The entire contents of PCT Application No. PCT/CN2020/101650 is incorporated herein by reference in its entirety.

TECHNICAL FIELD

This disclosure relates generally to systems and methods for image capture, and specifically to pipeline processing of captured images.

BACKGROUND

Abnormal black levels in image sensors, such as complementary metal-oxide-semiconductor (CMOS) image sensors, may result in visible reddish tints in black regions of an image. Color mismatch in image sensors may be amplified by an image signal processor (ISP). For example digital gain or dynamic gain compression (DRC) performed by an ISP may amplify the color mismatch, resulting in such reddish tints.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. The systems, methods, and devices of this disclosure each have several innovative aspects, no single one of which is solely responsible for the desirable attributes disclosed herein.

One innovative aspect of the subject matter described in this disclosure can be implemented as a method for color correction. The method can be performed by a suitable device, and may include receiving first image data corresponding to a reference luminance data and reference chrominance data for each of a plurality of pixels, determining that the first image data corresponds to a raw image captured in a dark environment, generating second image data by performing one or more tone mapping operations on the first image data, where the second image data corresponds to current luminance data and current chrominance data for each of the plurality of pixels, and generating output image data to include, for each pixel of the plurality of pixels: an output luminance value of a corresponding pixel of the current luminance data, and chrominance values of the corresponding pixel from a selected one of the reference chrominance data and the current chrominance data, the selection based at least in part on the reference chrominance data and the current chrominance data.

In some aspects, the first image data and the second image data are in a YUV format, the reference chrominance data including reference U data and reference V data, and the current chrominance data including current U data and current V data. In some aspects, for each pixel of the plurality of pixels, the output image data includes the reference chrominance data instead of the current chrominance data when the corresponding pixel of the first image data is detected as grey and the corresponding pixel of the second image data is detected as color tinted. In some aspects, detecting that a pixel in the first image data is grey includes determining that an absolute difference between the reference U data and a midpoint U value is less than a reference threshold, and determining that an absolute difference between the reference V data and a midpoint V value is less than the reference threshold. In some aspects, detecting that a pixel in the second image data is color tinted includes determining that respective absolute differences between the current U data and the midpoint U value, and between the current V data and the midpoint V value are each greater than a current minimum and less than a current maximum.

In some aspects, generating the second image data further includes performing one or more gamma correction operations and one or more sharpness enhancing operations on the first image data. In some aspects the first image data is determined to correspond to the raw image captured in the dark environment by determining that an automatic exposure control (AEC) gain associated with the raw image is greater than a threshold AEC gain.

Another innovative aspect of the subject matter described in this disclosure can be implemented in an apparatus comprising a memory and one or more processors. The one or more processors are configured to receive first image data corresponding to a reference luminance data and reference chrominance data for each of a plurality of pixels, determine that the first image data corresponds to a raw image captured in a dark environment, generate second image data by performing one or more tone mapping operations on the first image data, where the second image data corresponds to current luminance data and current chrominance data for each of the plurality of pixels, and generate output image data to include, for each pixel of the plurality of pixels: an output luminance value of a corresponding pixel of the current luminance data, and chrominance values of the corresponding pixel from a selected one of the reference chrominance data and the current chrominance data, the selection based at least in part on the reference chrominance data and the current chrominance data.

In some aspects, the first image data and the second image data are in a YUV format, the reference chrominance data including reference U data and reference V data, and the current chrominance data including current U data and current V data. In some aspects, for each pixel of the plurality of pixels, the output image data includes the reference chrominance data instead of the current chrominance data when the corresponding pixel of the first image data is detected as grey and the corresponding pixel of the second image data is color tinted. In some aspects, detecting that a pixel in the first image data is grey includes determining that an absolute difference between the reference U data and a midpoint U value is less than a reference threshold, and determining that an absolute difference between the reference V data and a midpoint V value is less than the reference threshold. In some aspects, detecting that a pixel in the second image data is color tinted includes determining that respective absolute differences between the current U data and the midpoint U value and between the current V data and the midpoint V value are each greater than a current minimum and less than a current maximum.

In some aspects, generating the second image data further includes performing one or more gamma correction operations and one or more sharpness enhancing operations on the first image data. In some aspects, the one or more processors are configured to determine that the first image data corresponds to the raw image captured in the dark environment by determining that an automatic exposure control (AEC) gain associated with the raw image is greater than a threshold AEC gain.

Another innovative aspect of the subject matter described in this disclosure can be implemented in a non-transitory computer-readable storage medium storing instructions for execution by one or more processors of an image processing device. Execution of the instructions causes the image processing device to perform operations including receiving first image data corresponding to reference luminance data and reference chrominance data for each of a plurality of pixels, determining that the first image data corresponds to a raw image captured in a dark environment, generating second image data by performing one or more tone mapping operations on the first image data, where the second image data corresponds to current luminance data and current chrominance data for each of the plurality of pixels, and generating output image data to include, for each pixel of the plurality of pixels: an output luminance value of a corresponding pixel of the current luminance data, and chrominance values of the corresponding pixel from a selected one of the reference chrominance data and the current chrominance data, the selection based at least in part on the reference chrominance data and the current chrominance data.

In some aspects, the first image data and the second image data are in a YUV format, the reference chrominance data including reference U data and reference V data, and the current chrominance data including current U data and current V data. In some aspects, for each pixel of the plurality of pixels, the output image data includes the reference chrominance data instead of the current chrominance data when the corresponding pixel of the first image data is detected as grey and the corresponding pixel of the second image data is detected as color tinted. In some aspects, detecting that a pixel in the first image data is grey includes determining that an absolute difference between the reference U data and a midpoint U value is less than a reference threshold, and determining that an absolute difference between the reference V data and a midpoint V value is less than the reference threshold. In some aspects, detecting that a pixel in the second image data is color tinted includes determining that respective absolute differences between the current U data and the midpoint U value and between the current V data and the midpoint V value are each greater than a current minimum and less than a current maximum.

In some aspects, generating the second image data further includes performing one or more gamma correction operations and one or more sharpness enhancing operations on the first image data. In some aspects the first image data is determined to correspond to the raw image captured in the dark environment by determining that an automatic exposure control (AEC) gain associated with the raw image is greater than a threshold AEC gain.

Another innovative aspect of the subject matter described in this disclosure can be implemented in an image processing pipeline. The image processing pipeline may include a raw image processing means to receive a raw image and perform one or more image processing operations on the raw image, a color correction matrix (CCM) means to perform one or more CCM operations on the processed raw image, a denoising means to perform one or more denoising operations on an output of the CCM means to generate first image data corresponding to reference luminance data and reference chrominance data for each of a plurality of pixels, a tone mapping means to generate second image data by performing one or more tone mapping operations on the first image data, the second image data corresponding to current luminance data and current chrominance data for each of the plurality of pixels, and a color correction means configured to: receive the first image data and the second image data, determine that the first image data corresponds to a raw image captured in a dark environment, and generate output image data including, for each pixel of the plurality of pixels, an output luminance value of a corresponding pixel of the current luminance data, and chrominance values of the corresponding pixel from a selected one of the reference chrominance data and the current chrominance data, the selection based at least in part on the reference chrominance data and the current chrominance data.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 4 is an illustrative flowchart depicting an example operation for color correction in an image processing pipeline, according to some implementations.

DETAILED DESCRIPTION

Figure 1:
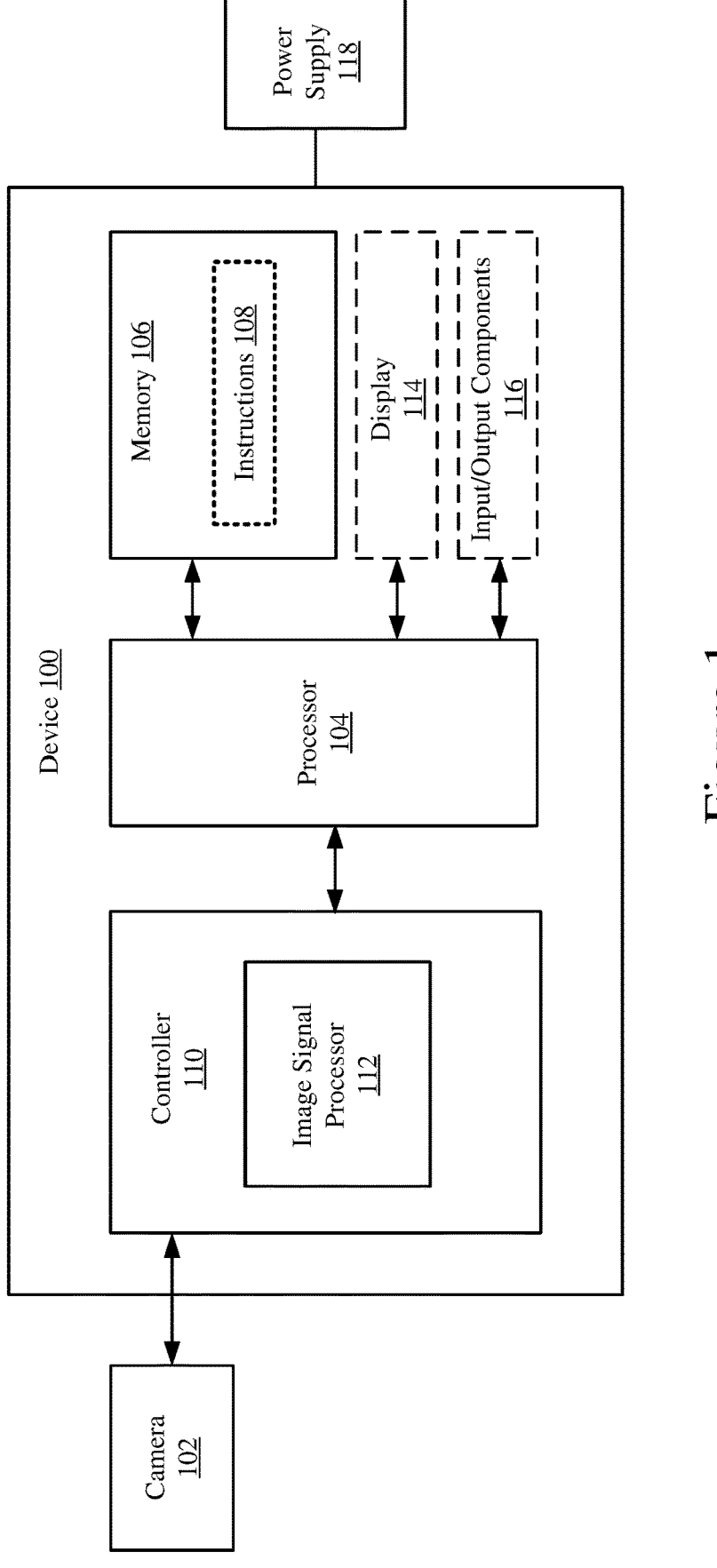
FIG. 1 is a block diagram of an example device configured to perform color correction, according to some implementations.

Aspects of the present disclosure may be used for detecting and correcting abnormal color tinted pixels in an image captured under low-light conditions. Abnormal color tinted pixels in an image may result from outputs from an image sensor indicating little to no light (which may be intended to be represented by a deep black). The color tinting may be amplified by a digital gain or a DRC performed by an ISP in processing the outputs from the image sensor. Such abnormal color tints may result in a black pixel of an image including a visible reddish tint. Conventional techniques for correcting such color tinted pixels may have a high false positive rate in detecting color tinted pixels, resulting in color degradation in one or more areas of an image not including color tinted pixels. Conventional techniques for correcting such color tinted pixels may additionally or alternatively have a high false negative rate in detecting color tinted pixels, resulting in a final image including pixels with uncorrected reddish tints. Conventional techniques typically process raw image data. Since using black level correction may not effectively suppress reddish tints in black pixels, and raw image data for red and green colors may be similar, a final image may include one or more black portions having alternating reddish and greenish tinted pixels.

Methods and apparatuses of the example implementations of the present disclosure may detect and correct pixels exhibiting such undesirable color tints of pixels of an image captured in low light environments. For example, an apparatus may detect one or more pixels that are converted from a grey pixel into a color tinted pixel at a stage in an image processing pipeline. When such pixels are detected, the color tint may be removed by replacing each of such pixels with a corresponding pixel from an earlier stage in the image processing pipeline. For example, color tinting may be caused by or amplified by one or more tone mapping operations in the image processing pipeline. Replacing a color tinted pixel with a corresponding grey pixel from an earlier stage may include replacing the tone mapped, color tinted pixel with a corresponding pixel from a stage in the image processing pipeline before the one or more tone mapping operations.

While conventional color tint correction techniques may operate on raw image data, some example implementations of the present disclosure may operate on image data in a YUV color space, where Y refers to the luminance, U to the blue projection chrominance, and V to the red projection chrominance. Other implementations may operate in other similar luma/chroma color spaces. Using such color spaces allows example implementations to focus color tint correction directly on the chrominance, without affecting the luminance of output pixels.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using." "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras and are therefore not limited to devices having one camera. Aspects of the present disclosure are applicable for cameras configured to capture still images as well as capture video and may be implemented in devices having or coupled to cameras of different capabilities.

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

FIG. 1 is a block diagram of an example device 100 configured to perform color correction, according to some implementations of the present disclosure. The example device 100 may include or be coupled to a camera 102, a processor 104, a memory 106 storing instructions 108, and a controller 110. In some implementations, the device 100 may include (or be coupled to) a display 114, and a number of input/output (I/O) components 116. The device 100 may also include a power supply 118, which may be coupled to or integrated into the device 100. The device 100 may include additional features or components not shown. For example, a wireless interface, which may include a number of transceivers and a baseband processor, may be included for a wireless communication device. In another example, the device 100 may include or be coupled to additional cameras other than the camera 102.

The camera 102 may be any suitable camera capable of capturing still images (such as individual captured image frames) and/or capturing video (such as a succession of captured image frames). The camera 102 may include a single image sensor or be a dual camera module or any other suitable module with one or more image sensors, such as one or more CMOS image sensors.

The memory 106 may be a non-transient or non-transitory computer readable medium storing computer-executable instructions 108 to perform all or a portion of one or more operations described in this disclosure. The processor 104 may be one or more suitable processors capable of executing scripts or instructions of one or more software programs (such as instructions 108) stored within the memory 106. In some aspects, the processor 104 may be one or more general purpose processors that execute instructions 108 to cause the device 100 to perform any number of functions or operations. In additional or alternative aspects, the processor 104 may include integrated circuits or other hardware to perform functions or operations without the use of software.

While shown to be coupled to each other via the processor 104 in the example of FIG. 1, the processor 104, the memory 106, the controller 110, the optional display 114, and the optional I/O components 116 may be coupled to one another in various arrangements. For example, the processor 104, the memory 106, the controller 110, the optional display 114, and/or the optional I/O components 116 may be coupled to each other via one or more local buses (not shown for simplicity).

The display 114 may be any suitable display or screen allowing for user interaction and/or to present items (such as captured images, video, or a preview image) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone, and speakers, and so on. The display 114 and/or the I/O components 116 may provide a preview image to a user and/or receive a user input for adjusting one or more settings of the camera 102.

The controller 110 may include one or more controllers. The one or more controllers may be configured to control the camera 102. The controller 110 may include an image signal processor (ISP) 112, which may be one or more image signal processors to process captured image frames or video provided by the camera 102. In some aspects, the controller 110 or the ISP 112 may execute instructions from a memory (such as instructions 108 from the memory 106 or instructions stored in a separate memory coupled to the ISP 112). In other aspects, the controller 110 or the ISP 112 may include specific hardware. The controller 110 or the ISP 112 may alternatively or additionally include a combination of specific hardware and the ability to execute software instructions. For example, the ISP 112 may include or otherwise be configured to implement one or more stages of an image processing pipeline.

Figure 2:
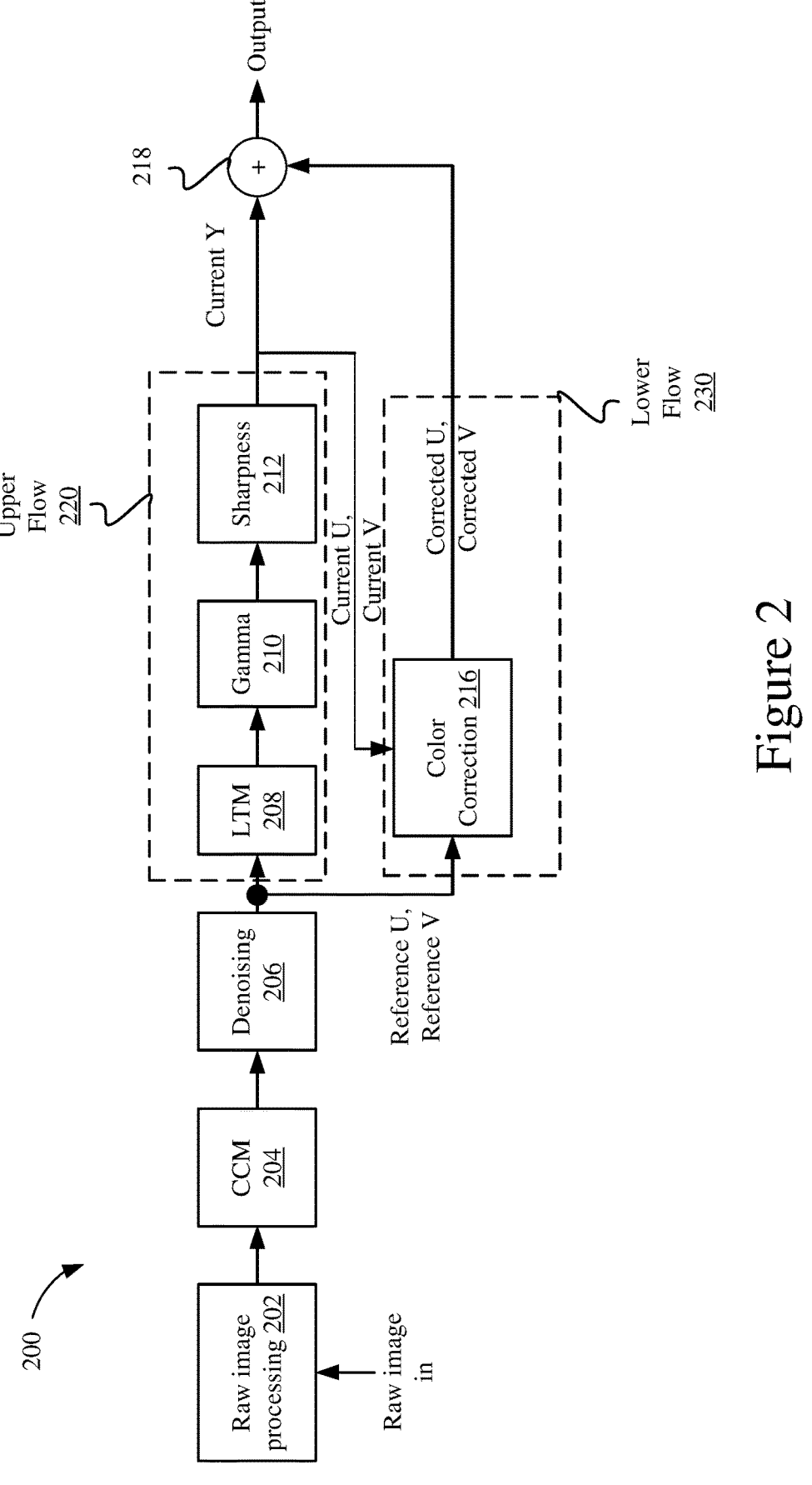
FIG. 2 shows an example processing flow for detecting and correcting abnormal color tinted pixels in a captured image, according to some implementations.

FIG. 2 shows an example processing flow 200 for detecting and correcting incorrectly color tinted pixels in a captured image, according to some implementations of the present disclosure. In some aspects, the processing flow 200 may be included in an image processing pipeline implemented or controlled by the device 100 shown in FIG. 1. While the processing flow 200 may be described as being performed by the device 100, the processing flow 200 may also be performed by any other suitable image capture device.

With respect to FIG. 2, raw image data may be an input to the processing flow 200. Such raw image data may, for example, be received from one or more image sensors included in or coupled to the device 100, or from an analog front end of the device 100. At raw image processing stage 202, the device 100 may perform one or more operations on the raw image data (such as one or more operations for black level correction, lens shading correction (LSC), auto focus, auto exposure, auto white balance, and so on). After processing the image data at the raw image processing stage 202, the device 100 may process the image data at the color correction matrix (CCM) stage 204. The processed raw image data may be converted into a red green blue (RGB) color space before proceeding to CCM stage 204. Alternatively, the device 100 may convert the data into the RGB color space at CCM stage 204. At CCM stage 204, the device 100 may perform one or more operations on the image data in the RGB color space (such as one or more operations for color correction in the RGB color space). In some examples, the device 100 may transform the RGB pixel values of the image data into a defined and known color space, represented by the color correction matrix. After the device 100 processes the image data at CCM stage 204, the device 100 processes the image data at denoising stage 206, performing one or more denoising operations on the image data. In some implementations, the denoising stage 206 may process the image data in a YUV color space, for example, the device 100 may convert the image data from the RGB color space into the YUV color space either before denoising stage 206 or at denoising stage 206. The output image data from the denoising stage 206 may be referred to as reference image data. For example, output YUV image data, representing the image data in the YUV color space, may include reference Y data representing the luminance of the image data and reference U data and reference V data representing the chrominance of the image data.

After the denoising stage 206, the processing flow 200 splits into multiple paths (such as an upper flow 220 and a lower flow 230 depicted in FIG. 2). Discussing the upper flow 220 first, the device 100 processes the image data at local tone mapping (LTM) stage 208. At LTM stage 208, the device 100 may perform one or more tone mapping operations on the image data. In some aspects, the LTM stage 208 may operate on the image data in an RGB color space. Thus, prior to or as a part of the LTM stage 208, the device 100 may convert the image data into the RGB color space. Tone mapping may adjust the brightness of different regions of the image data or combine different exposures in order to increase a local contrast between disparate regions of a scene. Local tone mapping may adjust the brightness of a given pixel based on local, as in nearby, features of the image, as opposed to global or spatially uniform tone mapping. After LTM stage 208, the device 100 may process the image data at gamma compression stage 210. At gamma compression stage 210, the device 100 may perform one or more operations to increase the exposure of underexposed parts of the image data, while decreasing the exposure of overexposed parts of the image data. In some aspects, the device 100 may apply a gamma function. For example, the device 100 may apply a gamma filter, such as $Y_{out}=AY_{in}{}^{\gamma}$, where $0<\gamma<1$ and $A>0$. In applying the gamma function, the device 100 maps the input luminance $Y_{in}$ in a domain of $[0, A^{-1/\gamma}]$ to the output luminance $(Y_{out})$ in a range of $[0,1]$. In the example gamma filter. $\gamma$ may be adjusted to regulate the contrast of the image, with lower values corresponding to lower contrast and increased exposure for underexposed portions of the image. A may be set to less than 1 to ensure that the exposure of one or more portions of the image is decreased enough to keep them from being overexposed.

After the gamma compression stage 210, the device 100 may process the image data at sharpness stage 212, which may perform one or more sharpness enhancing operations on the image data, for example an edge enhancement operation, a deblurring filtering operation, or similar. In some aspects, the device 100 may process the image data in the YUV color space at sharpness stage 212. Accordingly, either before or as a part of sharpness stage 212, the device 100 may convert the image data into the YUV color space. The output image data of the sharpness stage 212 may be referred to as current image data. For example, output YUV image data, representing the image data in the YUV color space, may include current Y data representing the luminance of the image data and a current U data and current V data representing the chrominance of the image data. The current Y data may be provided to the combiner 218. The current U data and current V data may be provided to the color correction stage 216.

At the color correction stage 216, the device 100 may selectively output either the reference U data and reference V data or the current U data and current V data for each pixel of the image data. As mentioned above, for images captured in low-light or dark environments, some grey pixels may be turned into color tinted pixels during image processing, which may result in a reddish tint appearing in black areas of an image. This may often result from tone mapping operations. As discussed in more detail below, the color correction stage 216 may detect when a captured image appears to be captured in a sufficiently dark environment. For such images, the device 100 may detect when a grey pixel is turned into a color tinted pixel (such as by comparing a reference U and V data and corresponding current U and V data). For such pixels, the device 100 may replace the current U and V data with the corresponding reference U and V data. In this manner, the image processing steps resulting in the abnormal color tint may be undone. The color correction stage 216 may output corrected U data and corrected V data to the combiner 218. The combiner 218 combines the current luminance data with the corrected U data and corrected V data to generate respective Y, U, and V data for the output image data. The output image data thus reflect the current luminance (Y) data and the corrected chrominance (U and V) data.

Figure 3:
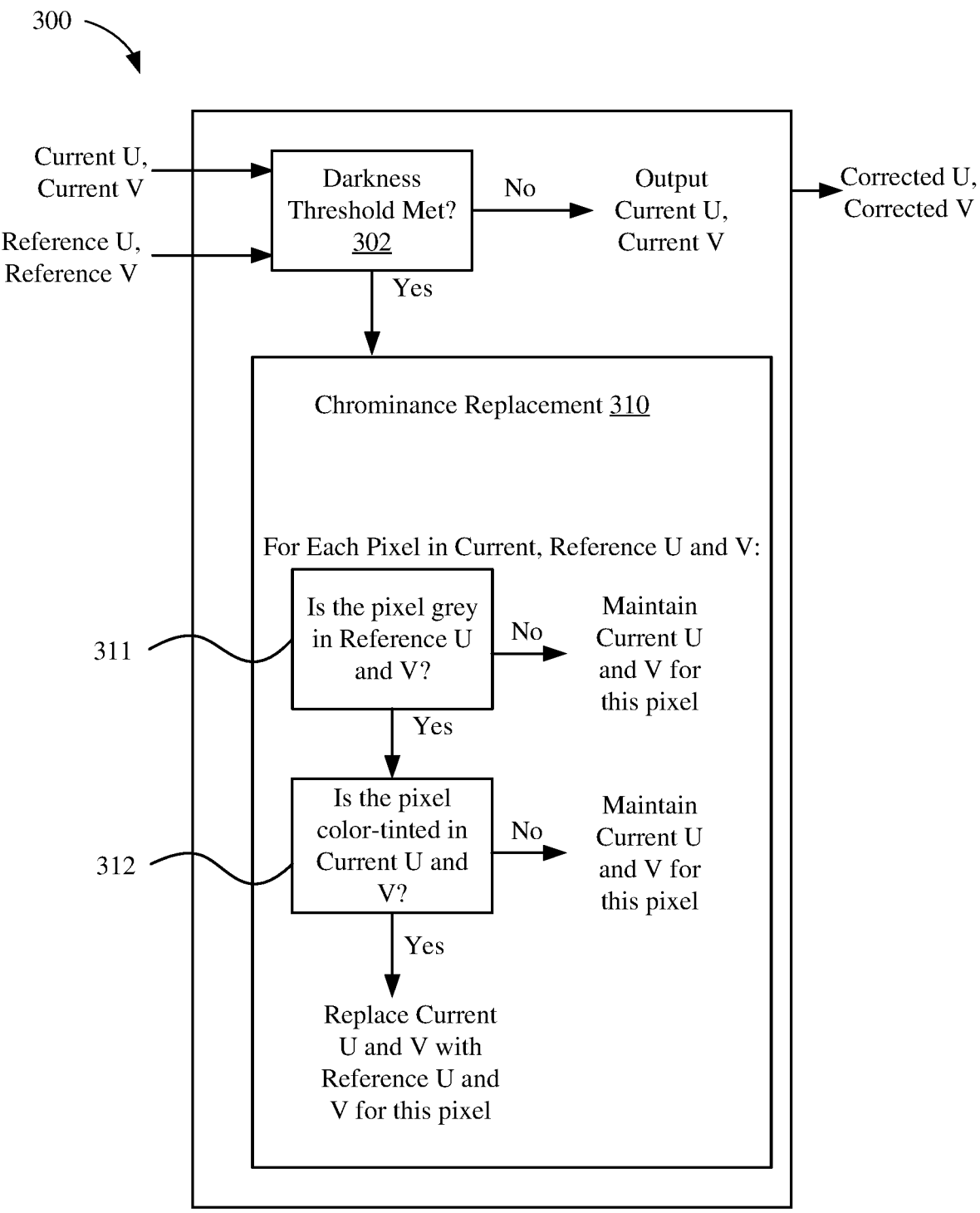
FIG. 3 shows an illustrative flowchart showing an example operation for processing image data in a color correction stage, according to some implementations.

FIG. 3 shows an illustrative flowchart showing an example operation 300 for processing image data in a color correction stage, according to some implementations of the present disclosure. In some aspects, the operation 300 may be performed by a device 100 at the color correction stage 216 of FIG. 2. Reference U and V data from the denoising stage 206 and current U and V data from the sharpness stage 212 may be used to generate corrected U and V data for an image. As discussed above, the reference U and V data may correspond to the image data before tone mapping has been performed. The current U and V data may correspond to the image data after tone mapping has been performed.

The abnormal color tint typically occurs in images captured in a dark environment. Accordingly, the device 100 makes a threshold determination 302 whether the image data meets a threshold darkness level. An example threshold darkness level may include an auto exposure correction gain threshold. For example, the device 100 may determine whether a total auto exposure correction gain for a captured image exceeds the auto exposure correction gain threshold. As discussed above, such auto exposure correction may occur as a part of raw image processing stage 202. Another example threshold darkness level may include a camera flash enablement threshold. For example, the device 100 may determine whether or not the environment was sufficiently dark for a camera flash to be enabled. Another example threshold darkness level may a light sensor threshold. For example, the device 100 may determine whether a light sensor included in or coupled to the device 100 senses less than a threshold amount of light. If the threshold darkness level is not met, then the operation 300 may output the current U data and the current V data as the corrected U data and the corrected V data, and the process may end.

If the threshold darkness level is met, then the image is a candidate image for replacing one or more pixels' current U and V data with reference U and V data. The operation 300 may proceed to chrominance replacement step 310, where the device 100 may perform a series of determinations for each pixel of the current and reference U and V data. For each pixel, the device 100 may determine in block 311 whether the pixel is grey in the reference U and V data. In some aspects, this determination may include determining that an absolute difference between the reference U data and the midpoint in the range of possible values of U (the "midpoint U value") is less than a reference threshold and an absolute difference between the reference V data and a midpoint in the range of possible values of V (the "midpoint V value") is also less than the reference threshold. Thus, a pixel is determined to be grey when its U and V values are sufficiently close to the midpoint U value and the midpoint V value, respectively. A pixel is therefore grey when ($|$REF U−MID U$|$<REF_TH) and ($|$REF V−MID V$|$<REF_TH), where REF U is the reference U data and REF V is the reference V data. MID U is the midpoint U value and MID V is the midpoint V value. For example, if the possible range of U and V values is between 0 and 256, then the midpoint U and V values are each 128. Determining whether the pixel is grey may include determining whether or not both ($|$REF U−128$|$<REF_TH) and ($|$REF V−128$|$<REF_TH). In some implementations, the reference threshold may be a single-digit reference threshold, for U and V having ranges between 0 and 256. In one example, the reference threshold may be 4. In some implementations, determining that a pixel in the reference data is grey may also include determining that an absolute difference between the reference U data and reference V data is less than the reference threshold, that is, determining that $|$REF U−REF V$|$<REF_TH. If each of these absolute differences is less than the reference threshold, then the pixel is considered grey. If the pixel is not considered grey in the reference U and V data, then the current U and current V data are maintained in the corrected U and V data for that pixel. If the pixel is grey in the reference U and V data, then the device 100 may determine, in block 312, whether the pixel is color tinted in the current U and V data.

Note that in some implementations the reference threshold may vary based at least in part on the automatic exposure control (AEC) gain and/or the dynamic range compression (DRC) gain. For example, for larger AEC gains or DRC gains, a higher reference threshold may be used as compared to when the AEC gain or DRC gain is lower. The AEC gain and DRC gain may depend on the characteristics of the image sensor used by the device 100. Consequently, the reference threshold may vary under the same lighting conditions for different image sensors under the same lighting conditions.

At block 312, determining whether or not the pixel is color tinted in the current U data and current V data may include determining that each of the current U data and current V data has at least a minimum difference and no more than a maximum difference from the midpoint U value and midpoint V value, respectively, that is, determining that an absolute difference between the current U data and the midpoint U value, and an absolute difference between the current V data and the midpoint V value are each between a current minimum value and less than a current maximum value. Thus, a pixel in the current U data and current V data may be determined to be color tinted when $|$CUR U−MID U$|$∈[CUR$_{MIN}$, CUR$_{MAX}$] and $|$CUR V−MID V$|$∈[CUR$_{MIN}$, CUR$_{MAX}$], where CUR U and CUR V are the current U data and current V data, respectively, CUR$_{MIN}$ is the current minimum value, and CUR$_{MAX}$ is the current maximum value. The current minimum value may be greater than or equal to the reference threshold. In some implementations, the current minimum value may be the same as the reference threshold, and may be, for example, 4 when the U and V data range between 0 and 256. In some implementations the current maximum value may be selected to be a multiple of the current minimum value, such as three times the current minimum value. In one example, the current maximum value may be 12 when the U and V data range between 0 and 256. If the pixel is not determined to be color tinted in the current U data and current V data, then the current U data and current V data may be maintained in the corrected U data and corrected V data. If the pixel is determined to be color tinted, then the corrected U data and corrected V data for the pixel may include the reference U data and reference V data, rather than the current U data and current V data. Processing each pixel in the current and reference U and V data using chrominance replacement step 310 thus generates the corrected U data and corrected V data for images meeting the threshold darkness level.

The operation 300 may thus generate the corrected U data and corrected V data, which may, for example, be output to the combiner 218 for incorporation as the U data and V data in the output of the processing flow 200.

Note that while operation 300 describes generating the corrected U data and corrected V data on a per pixel basis, in some other implementations the corrected U data and corrected V data may be determined on a per-window or per-region basis. For example, the image corresponding to the reference and current U and V data may be divided into a plurality of windows or regions, and for each window or region, the corrected U and V data may include either the reference U and V data or the current U and V data. In some implementations, a representative value may be selected for each of the reference U and V data and the current U and V data. Such a representative value may be a predetermined pixel of the region or window, such as a center pixel, or an upper-leftmost pixel, or the like, or may be an average value, such as a mean or median value, of pixels in the window or region. In some examples, the chrominance replacement step 310 of FIG. 3 may be performed on the representative value to determine whether the corrected U and V data for the window or region should include the values of the reference U and V data or the current U and V data.

Further, note that while the operation 300 describes replacing abnormally color-tinted pixels in the current U data and current V data with the corresponding pixels of the reference U data and reference V data, in some other implementations abnormally color-tinted pixels in the current U data and current V data may be replaced by U and V data for a predetermined grey pixel value. For example, at block 312, in response to determining that the pixel is color-tinted in the current U data and current V data, the chrominance replacement step 310 may replace the current U data and the current V data with the U and V data for the predetermined grey pixel value. In some aspects, such a predetermined grey pixel value may have U and V data corresponding to the midpoint U value and the midpoint V value.

FIG. 4 is an illustrative flow chart depicting an example operation 400 for color correction in an image processing pipeline, according to some implementations of the present disclosure. The operation 400 may be performed by any suitable device including or coupled to an image processing pipeline. In some implementations, the operation 400 may be performed by device 100 shown in FIG. 1. At block 402, the device 100 receives first image data corresponding to reference luminance data and reference chrominance data for each of a plurality of pixels. At block 404, the device 100 determines that the first image data corresponds to a raw image captured in a dark environment. For example, this determination may be based at least in part on an automatic exposure control (AEC) gain associated with the raw image being greater than a threshold AEC gain. At block 406, the device 100 generates second image data by performing one or more tone mapping operations on the first image data, where the second image data corresponds to current luminance data and current chrominance data for each of the plurality of pixels. At block 408, the device 100 generates output image data for each pixel of the plurality of pixels. For each pixel of the plurality of pixels, generating the output data may include generating the output data to include an output luminance value of a corresponding pixel of the current luminance data (408A), and to include chrominance values of the corresponding pixel from a selected one of the reference chrominance data and the current chrominance data, where the selection is based at least in part on the reference chrominance data and the current chrominance data (408B). In some aspects, the reference chrominance data may be selected when the corresponding pixel of the first image data is determined to be grey and the corresponding pixel of the second image data is determined to be color tinted. In some aspects, the current chrominance data is selected when the corresponding pixel of the first image data is not determined to be grey or the corresponding pixel of the second image data is not determined to be color tinted.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 106 in the example device 100 of FIG. 1) comprising instructions 108 that, when executed by the processor 104 (or the controller 110 or the ISP 112), cause the device 100 to perform one or more of the methods described above. The non-transitory processor-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the embodiments disclosed herein may be executed by one or more processors, such as the processor 104 or the ISP 112 in the example device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor and/or any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

While the present disclosure shows illustrative aspects, it should be noted that various changes and modifications could be made herein without departing from the scope of the appended claims. For example, one or more processing steps in the processing flow 200 may be omitted, or one or more additional processing steps may be added. Additionally, the functions, steps or actions of the method claims in accordance with aspects described herein need not be performed in any particular order unless expressly stated otherwise. For example, the steps of the described example operations, if performed by the device 100, the controller 110, the processor 104, and/or the ISP 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for color correction in an image processing pipeline, comprising:

receiving first image data corresponding to reference luminance data and reference chrominance data for each of a plurality of pixels;

determining that the first image data corresponds to a raw image captured in a dark environment;

generating second image data by performing one or more tone mapping operations on the first image data, the second image data corresponding to current luminance data and current chrominance data for each of the plurality of pixels; and generating output image data to include, for each pixel of the plurality of pixels:

an output luminance value of a corresponding pixel of the current luminance data; and chrominance values of the corresponding pixel from a selected one of either the reference chrominance data or the current chrominance data, the selection based at least in part on the reference chrominance data and the current chrominance data, wherein for each pixel of the plurality of pixels, the output image data includes the reference chrominance data instead of the current chrominance data when the corresponding pixel of the first image data is detected as grey and the corresponding pixel of the second image data is detected as color tinted.

2. The method of claim 1, wherein the first image data and the second image data are in a YUV format, the reference chrominance data comprises reference U data and reference V data, and the current chrominance data comprises current U data and current V data.

3. The method of claim 2, wherein detecting that a pixel in the first image data is grey comprises:

determining that an absolute difference between the reference U data and a midpoint U value is less than a reference threshold.

4. The method of claim 3, wherein detecting that a pixel in the first image data is grey further comprises determining that an absolute difference between the reference U data and the reference V data is less than the reference threshold.

5. The method of claim 3, wherein detecting that a pixel in the first image data is grey further comprises determining that an absolute difference between the reference V data and a midpoint V value is less than the reference threshold.

6. The method of claim 5, wherein the midpoint U value and the midpoint V value are each 128, and wherein respective ranges of U and V values in the YUV format are between 0 and 256.

7. The method of claim 2, wherein detecting that a pixel in the second image data is color tinted comprises:

determining that an absolute difference between the current U data and a midpoint U value is greater than or equal to a current minimum and less than or equal to a current maximum; and determining that an absolute difference between the current V data and a midpoint V value is greater than or equal to the current minimum and less than or equal to the current maximum.

8. The method of claim 1, wherein determining that the first image data corresponds to the raw image captured in a dark environment comprises determining that an automatic exposure control (AEC) gain associated with the raw image is greater than a threshold AEC gain.

9. The method of claim 1, wherein generating the second image data further comprises performing one or more gamma correction operations and one or more sharpness enhancing operations on the first image data.

10. An apparatus comprising a memory and one or more processors, wherein the one or more processors are configured to:

receive first image data corresponding to reference luminance data and reference chrominance data for each of a plurality of pixels;

determine that the first image data corresponds to a raw image captured in a dark environment;

generate second image data by performing one or more tone mapping operations on the first image data, the second image data corresponding to current luminance data and current chrominance data for each of the plurality of pixels; and generate output image data to include, for each pixel of the plurality of pixels:

an output luminance value of a corresponding pixel of the current luminance data; and chrominance values of the corresponding pixel from a selected one of either the reference chrominance data or the current chrominance data, the selection based at least in part on the reference chrominance data and the current chrominance data, wherein for each pixel of the plurality of pixels, the output image data includes the reference chrominance data instead of the current chrominance data when the corresponding pixel of the first image data is detected as grey and the corresponding pixel of the second image data is detected as color tinted.

11. The apparatus of claim 10, wherein the first image data and the second image data are in a YUV format, the reference chrominance data comprises reference U data and reference V data, and the current chrominance data comprises current U data and current V data.

12. The apparatus of claim 11, wherein the one or more processors are configured to detect that a pixel in the first image data is grey by:

determining that an absolute difference between the reference U data and a midpoint U value is less than a reference threshold.

13. The apparatus of claim 12, wherein the one or more processors are further configured to detect that a pixel in the first image data is grey by determining that an absolute difference between the reference U data and the reference V data is less than the reference threshold.

14. The apparatus of claim 12, wherein the one or more processors are further configured to detect that a pixel in the first image data is grey by determining that an absolute difference between the reference V data and a midpoint V value is less than the reference threshold.

15. The apparatus of claim 14, wherein the midpoint U value and the midpoint V value are each 128, and wherein respective ranges of U and V values in the YUV format are between 0 and 256.

16. The apparatus of claim 11, wherein the one or more processors are configured to detect that a pixel in the second image data is color tinted by:

determining that an absolute difference between the current U data and a midpoint U value is greater than or equal to a current minimum and less than or equal to a current maximum; and determining that an absolute difference between the current V data and a midpoint V value is greater than or equal to the current minimum and less than or equal to the current maximum.

17. The apparatus of claim 10, wherein the one or more processors are configured to determine that the first image data corresponds to the raw image captured in the dark environment by determining that an automatic exposure control (AEC) gain associated with the raw image is greater than a threshold AEC gain.

18. The apparatus of claim 10, wherein the one or more processors are configured to generate the second image data based on performing one or more gamma correction operations and one or more sharpness enhancing operations on the first image data.

19. A non-transitory computer-readable storage medium storing instructions that when executed by one or more processors of an image processing device, causes the image processing device to perform operations comprising:

receiving first image data corresponding to reference luminance data and reference chrominance data for each of a plurality of pixels;

determining that the first image data corresponds to a raw image captured in a dark environment;

generating second image data by performing one or more tone mapping operations on the first image data, the second image data corresponding to current luminance data and current chrominance data for each of the plurality of pixels; and generating output image data to include, for each pixel of the plurality of pixels:

an output luminance value of a corresponding pixel of the current luminance data; and chrominance values of the corresponding pixel from a selected one of either the reference chrominance data or the current chrominance data, the selection based at least in part on the reference chrominance data and the current chrominance data, wherein for each pixel of the plurality of pixels, the output image data includes the reference chrominance data instead of the current chrominance data when the corresponding pixel of the first image data is detected as grey and the corresponding pixel of the second image data is detected as color tinted.

20. The non-transitory computer-readable storage medium of claim 19, wherein the first image data and the second image data are in a YUV format, the reference chrominance data comprises reference U data and reference V data, and the current chrominance data comprises current U data and current V data.

21. The non-transitory computer-readable storage medium of claim 20, wherein execution of the instructions for detecting that a pixel in the first image data is grey further causes the image processing device to perform operations comprising:

determining that an absolute difference between the reference U data and a midpoint U value is less than a reference threshold; and determining that an absolute difference between the reference V data and a midpoint V value is less than the reference threshold.

22. The non-transitory computer-readable storage medium of claim 21, wherein execution of the instructions for detecting that a pixel in the first image data is grey further causes the image processing device to determine that an absolute difference between the reference U data and the reference V data is less than the reference threshold.

23. The non-transitory computer-readable storage medium of claim 22, wherein the midpoint U value and the midpoint V value are each 128, and wherein respective ranges of U and V values in the YUV format are between 0 and 256.

24. The non-transitory computer-readable storage medium of claim 20, wherein execution of the instructions for detecting that a pixel in the second image data is color tinted causes the image processing device to perform operations further comprising:

determining that an absolute difference between the current U data and a midpoint U value is greater than or equal to a current minimum and less than or equal to a current maximum; and determining that an absolute difference between the current V data and a midpoint V value is greater than or equal to the current minimum and less than or equal to the current maximum.

25. The non-transitory computer-readable storage medium of claim 19, wherein execution of the instructions for determining that the first image data corresponds to the raw image captured in a dark environment causes the image processing device to perform operations further comprising determining that an automatic exposure control (AEC) gain associated with the raw image is greater than a threshold AEC gain.

26. The non-transitory computer-readable storage medium of claim 19, wherein execution of the instructions for generating the second image data causes the image processing device to perform operations further comprising performing one or more gamma correction operations and one or more sharpness enhancing operations on the first image data.

27. An image processing pipeline, comprising:

a raw image processing means to receive a raw image and perform one or more image processing operations on the raw image to produce a processed raw image;

a color correction matrix (CCM) means to perform one or more CCM operations on the processed raw image;

a denoising means to perform one or more denoising operations on an output of the CCM means to generate first image data corresponding to reference luminance data and reference chrominance data for each of a plurality of pixels; 5 a tone mapping means to generate second image data by performing one or more tone mapping operations on the first image data, the second image data corresponding to current luminance data and current chrominance data for each of the plurality of pixels; and 10 a color correction means configured to:

receive the first image data and the second image data;

determine that the first image data corresponds to a raw image captured in a dark environment; and generate output image data including, for each pixel of 15 the plurality of pixels:

an output luminance value of a corresponding pixel of the current luminance data; and chrominance values of the corresponding pixel from a selected one of either the reference chrominance data 20 or the current chrominance data, the selection based at least in part on the reference chrominance data and the current chrominance data, wherein for each pixel of the plurality of pixels, the output image data includes the reference chrominance data instead of 25 the current chrominance data when the corresponding pixel of the first image data is detected as grey and the corresponding pixel of the second image data is detected as color tinted.

* * * * * 30